Patented Oct. 26, 1943

2,333,061

UNITED STATES PATENT OFFICE 2,333,061

INSECTICIDE

Marquis D. L. Van Over, Union, N. J., assignor to Woburn Degreasing Company, Harrison, N. J.

No Drawing. Application April 10, 1939,
Serial No. 267,172

6 Claims. (Cl. 71—3)

The present invention relates to a new and useful composition of matter destructive to lower animal life.

An object of this invention is to provide a substance which is adapted to be used as an insecticide.

Another object is to provide a substance which is lethal to insects and the like, but is not harmful to higher animal or plant life.

A further object is to utilize the extracts from plants in the family "Euphorbiaceae" such as the castor plant Ricinus communis, as an insecticide, or the like.

Another object is to utilize the extracts from the leaves and the stalks of the plants in the family "Euphorbiaceae" especially the castor plant, as an insecticide or the like.

Another object is to provide an insect powder which is water soluble and is effective against insect life in general including dog and cat fleas, the stick-tite flea, chicken lice, mites and the like without any toxic effect to higher animals, such as dogs and cats.

Another object is to provide a liquid extract from the castor plant or like plants in the family "Euphorbiaceae," including the plant organs singly or in combination, which is adapted to destroy lower animal life.

Other and further objects and advantages of this invention will be apparent from the following description thereof and from the claims appended thereto.

In carrying out the present invention the castor plant leaves and stems are preferably ground up in any suitable apparatus, such as a pebble mill, and the following three examples will more clearly illustrate the process involved in extracting the active principle therefrom.

EXAMPLE 1

The castor bean leaves or stems, or both, either dried or green, in a natural or ground-up state, are put into a closed vessel, vented under liquid seal, and allowed to ferment and form various poisonous alcohols. At the end of the period of fermentation the material will contain approximately 10 to 12% of the poisonous alcohols which are distilled off. The resulting distillate is a non-inflammable insect spray which may be diluted with water or any other desirable vehicle. This spray is particularly lethal to flies, mosquitoes and the like. The residual liquid which remains in the still after the distillation step is pressed or otherwise removed from the solid residue and is used as a spray either in a diluted or undiluted state. This liquid spray is particularly lethal to fungus, scale and the like. The solid matter remaining as a still residue is used either in a wet or dry state as an insecticide and may be combined with fertilizer ingredients in a manner as hereinafter more fully explained.

EXAMPLE 2

Castor bean leaves or stems, or both, either dried or green, in a natural or ground-up condition, are put into an open vessel, adding thereto from one to fifty parts by weight of water. This mixture is heated for a period of one to fifty hours depending upon the concentration of liquid extract which is desired, at a temperature slightly below the evaporation point. The solid residue is then pressed to extract the liquid therefrom, which liquid is filtered. This filtered liquid will act as an effective insecticide having extracted from the leaves or stems, or both, of the castor plant sufficient ricin and other chemicals during the heating period to impart insecticidal properties thereto. This liquid is used as a spray either in a concentrated or diluted state. The residual solid matter is used in a wet or dry state as an insecticide and can be combined with a fertilizer.

EXAMPLE 3

Castor bean leaves or stems, or both, either dried or green in a natural or ground-up condition, are put into a closed vessel, adding from one to fifty parts by weight of water. This mixture is heated for a period of fifteen to thirty-five hours at a temperature of 150° to 350° F., either under atmospheric or elevated pressure. The distillate is carried off to a separate receptacle and is used as a non-inflammable insect spray either in a concentrated or diluted form. The residual liquid and solid are treated in the same manner as under Example 1.

In the above examples the pressures, temperatures and periods of heating are not critical to the production of an efficient insecticide and fungicide. These factors may be altered depending upon the process of extraction used. It is critical to use such temperature, pressure and time factors in the process so that the active principle which possesses the insecticidal and fungicidal properties is extracted from the castor plant. The above examples illustrate the use of the castor leaves or stems, or both, but it is to be understood that the castor bean can be used either alone or in combination with the other plant organs.

The solid residue which remains in the still after the extraction of the liquid as explained in the aforementioned Examples 1, 2 and 3, is used as an insecticidal fertilizer material such as bone phosphate of lime or other fertilizer elements or soil conditioners which are added to make up soil deficiency. This solid residue is preferably dried, powdered and mixed with an inert substance such as diatomaceous earth or with any one of, or group of known soil fertilizers to be used as a ground insecticide. The active insecticidal principle remaining in the solid residue depends upon the time and manner of treatment.

The leaves or stalks, or both, of the castor plant can be suitably dried and powdered without first substantially removing the liquid extract therefrom. This powder possesses high insecticidal and fungicidal properties and can be used alone to dust foliage or the like, or in combination with an inert material, such as diatomaceous earth, or with known fertilizers as a ground insecticide. The powder is not harmful to the foliages and is removed from edible fruits or the like by water. The insect powder as well as the spray is effective against the cotton boll weevil, the Japanese beetle, flies, mosquitoes and other plant and animal life which are destructive and annoying.

In the present treatment of citrus fruit trees, particularly those in Florida, three separate and distinct insecticides are utilized. Nicotine dust or liquid nicotine is used to kill off aphis, a lime and sulfur solution for rust mite, and an oil spray for Florida red scale. I have found that one spray which comprises the extract of the active principle from the castor plant, takes the place of the three separate insecticides presently used for the killing of aphis and Florida red scale. This results in a considerable saving to the grower of citrus fruits.

The following specific examples will illustrate several ways in which the solid residue resulting from the processes outlined in the above Examples 1, 2 and 3, in powdered form, or the concentrated insect powder aforementioned, is used in combination with fertilizers.

EXAMPLE 1
Truck fertilizer

| | Pounds |
|---|---|
| Castor pomace | 1,427 |
| Ammonium phosphate | 298 |
| Potassium sulphate | 150 |
| Dolomite | 75 |
| Castor leaves or stalks, or both | 50 |
| | 2,000 |

EXAMPLE 2
Fruit and shrub fertilizer

| | Pounds |
|---|---|
| Castor pomace | 1,323 |
| Ammonium phosphate | 280 |
| Potassium sulphate | 210 |
| Urea | 87 |
| Dolomite | 50 |
| Castor leaves or stalks, or both | 50 |
| | 2,000 |

EXAMPLE 3
Potato and vegetable fertilizer

| | Pounds |
|---|---|
| Castor pomace | 1,310 |
| Ammonium phosphate | 290 |
| Potassium sulphate | 300 |
| Dolomite | 50 |
| Castor leaves or stalks, or both | 50 |
| | 2,000 |

EXAMPLE 4
Tobacco fertilizer

| | Pounds |
|---|---|
| Castor pomace | 1,508 |
| Superphosphate—16% | 156 |
| Urea | 80 |
| Potassium sulphate | 156 |
| Dolomite | 50 |
| Castor leaves or stalks, or both | 50 |
| | 2,000 |

EXAMPLE 5
Lawn and pasture fertilizer

| | Pounds |
|---|---|
| Castor pomace | 1,450 |
| Ammonium phosphate | 300 |
| Urea | 50 |
| Potassium sulphate | 50 |
| Dolomite | 100 |
| Castor leaves or stalks, or both | 50 |
| | 2,000 |

It is to be understood that various modifications may be made in this invention without departing from the scope thereof.

What is claimed is:

1. In combination with a fertilizer, a composition of matter comprising a material selected from the group consisting of one or more organs of the castor plant for use as an insecticide.

2. In combination with a truck fertilizer comprising the following ingredients:

| | Pounds |
|---|---|
| Castor pomace | 1,427 |
| Ammonium phosphate | 298 |
| Potassium sulphate | 150 |
| Dolomite | 75 | an insecticide comprising by weight 50 lbs. of a material selected from the group consisting of castor leaves and stalks.

3. In combination with a fruit and shrub fertilizer comprising the following ingredients:

| | Pounds |
|---|---|
| Castor pomace | 1,323 |
| Ammonium phosphate | 280 |
| Potassium sulphate | 210 |
| Urea | 87 |
| Dolomite | 50 | an insecticide comprising by weight 50 lbs. of a material selected from the group consisting of castor leaves and stalks.

4. In combination with a potato and vegetable fertilizer comprising the following ingredients:

| | Pounds |
|---|---|
| Castor pomace | 1,310 |
| Ammonium phosphate | 290 |
| Potassium sulphate | 300 |
| Dolomite | 50 | an insecticide comprising by weight 50 lbs. of a material selected from the group consisting of castor leaves and stalks.

5. In combination with a tobacco fertilizer comprising the following ingredients:

| | Pounds |
|---|---|
| Castor pomace | 1,508 |
| Superphosphate—16% | 156 |
| Urea | 80 |
| Potassium sulphate | 156 |
| Dolomite | 50 | an insecticide comprising by weight 50 lbs. of a material selected from the group consisting of castor leaves and stalks.

6. In combination with a lawn and pasture fertilizer comprising the following ingredients:

| | Pounds |
|---|---|
| Castor pomace | 1,450 |
| Ammonium phosphate | 300 |
| Urea | 50 |
| Potassium sulphate | 50 |
| Dolomite | 100 | an insecticide comprising by weight 50 lbs. of a material selected from the group consisting of castor leaves and stalks.

MARQUIS D. L. VAN OVER.